(12) United States Patent
Belitsch

(10) Patent No.: US 11,630,044 B2
(45) Date of Patent: Apr. 18, 2023

(54) OSCILLATOR FOR DENSITY MEASUREMENT OF A LIQUID

(71) Applicant: Wolfgang Belitsch, Hart (AT)

(72) Inventor: Wolfgang Belitsch, Hart (AT)

(*) Notice: Subject to any disclaimer, the term of this patent is extended or adjusted under 35 U.S.C. 154(b) by 301 days.

(21) Appl. No.: 17/017,387

(22) Filed: Sep. 10, 2020

(65) Prior Publication Data
US 2021/0080366 A1 Mar. 18, 2021

(30) Foreign Application Priority Data
Sep. 12, 2019 (AT) ............... A 50795/2019

(51) Int. Cl.
*G01N 9/00* (2006.01)
*G01K 7/22* (2006.01)

(52) U.S. Cl.
CPC ............ *G01N 9/002* (2013.01); *G01K 7/22* (2013.01); *G01N 2009/006* (2013.01)

(58) Field of Classification Search
CPC .... G01N 9/00; G01N 9/002; G01N 2009/006; G01K 7/22; G01K 13/00
See application file for complete search history.

(56) References Cited

U.S. PATENT DOCUMENTS

2015/0033874 A1* 2/2015 Wang ................. G01F 1/8422
73/861.355

FOREIGN PATENT DOCUMENTS

AT 12626 U1 * 7/2012 ............... G01N 9/00

* cited by examiner

*Primary Examiner* — Benjamin R Schmitt
(74) *Attorney, Agent, or Firm* — Workman Nydegger

(57) ABSTRACT

An oscillator for density measurement of a liquid, including a counter mass and a container for the liquid. The oscillator is made of metal and the container has two identical resonator tubes, which are clamped into the counter mass in parallel to each other, and a connecting tube connecting the resonator tubes. The resonator tubes can be set into a resonance oscillation in which a common centre of gravity of the resonator tubes remains at rest during the resonance oscillation. The oscillator also includes a web located between the counter mass and the connecting tube, which web spaces the resonator tubes from each other in such a way that the lengths (L) of the resonator tubes enclosed between the counter mass and the web can be set into a diametrically opposite oscillation on the basis of which the density of the liquid located in the oscillator can be determined.

9 Claims, 4 Drawing Sheets

OSCILLATOR FOR DENSITY MEASUREMENT OF A LIQUID

BACKGROUND

The invention relates to an oscillator for density measurement of a liquid, comprising a counter mass and a container for the liquid, wherein the oscillator is made of metal and the container has two identical resonator tubes, which are clamped into the counter mass essentially in parallel to each other, and a connecting tube connecting the resonator tubes and a web for reinforcement, wherein the resonator tubes can be set into a resonance oscillation in which the common centre of gravity of the resonator tubes remains at rest during the resonance oscillation.

For measuring the density of liquids, it has been known for decades to fill liquids into so-called oscillators and to measure a resonance frequency of the oscillator after it has been excited. The principle of measurement in such oscillators is based on a spring-mass oscillator, the mass of which is made up of the oscillator, on the one hand, and the liquid to be measured, on the other hand.

In the following, the prior art is explained with reference to FIGS. 1-3, in each of which oscillators known from the prior art are illustrated.

A first example of a prior art oscillator 1 is illustrated in FIG. 1. This oscillator 1 comprises a U-shaped tube 2 and a counter mass 3 into which the tube 2 is clamped with its two ends so that the tube 2 can oscillate with a free length L. With this original shape of the oscillator 1, the tube 2 bent into a U-shape is deflected vertically to the plane in which the U-shaped tube 2 is located, in the directions R, –R against its rest position, and is thus excited toward a resonance oscillation (e.g., DMA 5000 from Anton Paar GmbH or Excellence D6 from Mettler Toledo). This involves the advantage that the resonance frequency is relatively low (a few 100 Hertz), but the disadvantage that the so-called counter mass 3, on which the U-shaped tube 3 is attached, must be comparatively large (approx. 8 to 10 kg), since otherwise the measuring error would be too large for densities of different magnitudes of the measuring liquid.

In FIG. 2 it is shown that the drawback of the large counter mass 3 can be remedied with a different oscillator 4. For this purpose, a double-bent U-shaped tube is employed, wherein a first U-shaped tube 5 swings against a second U-shaped tube 6, which is identical to the first one, with the position of the common centre of gravity remaining unchanged even in case of varying densities of the measuring liquid (e.g., DMA 35 from Anton Paar GmbH or Densito from Mettler Toledo). With this shape, a large counter mass 3 is therefore not necessary. The disadvantage of this shape is that the arc 7 forming the connection between the two U-tubes 5, 6, which oscillate against each other, is softer than the junction point on the respective other side of the U-tubes. Another disadvantage is that the two U-tubes, which oscillate against each other, cannot be manufactured so as to be precisely identical, not even in an automated production. This results in a lower accuracy of the density measurement by means of this oscillator 4. It is an advantage that this oscillator 4 requires a small counter mass 3, whereby a measuring device of a low weight can be constructed (for example, as a hand-held measuring device). In AT 520 318 B1, a further development of this oscillator 4 is disclosed, which comprises a stabilizing element within the arc 7, but with the drawbacks of the U-tubes oscillating against each other persisting in essence.

The drawback of the soft junction point 7 and of the fact that the two U-tubes 5, 6 cannot be manufactured in exactly the same way is eliminated by a further oscillator 8, which is illustrated in FIG. 3. In this case, two identical straight tubes 9, 10, which are interconnected by a rigid connecting piece 11 (e.g., a density module in SVM 3001 or Snap 50 from Anton Paar GmbH), swing against each other. With this oscillator 8, a high degree of measuring accuracy can be achieved with a small counter mass 3. In addition to the high resonance frequency, this oscillator 8 involves the disadvantage that the connecting piece 11 of glass cannot be manufactured easily. Therefore, this shape is used mainly for oscillators made of metal.

Another problem arises in the oscillator 8 of FIG. 3 if it is to be temperature-controlled. As is generally known, the density of the liquid to be measured is strongly dependent on its temperature, and therefore the oscillator filled with the liquid is brought to a certain reference temperature with the aid of a temperature control unit, for example, in order to measure the density at a desired reference temperature. In case of measuring liquids (such as, e.g., alcohol in water) for which the temperature dependence of the density is exactly known, thermostatting can be omitted. The temperature of the measuring liquid is measured with the aid of a temperature sensor 12 (for example, an NTC resistor) on the oscillator tube filled with the measuring liquid, and the measured value is calculated using the known temperature coefficient for the desired temperature. In doing so, it is important that the temperature of the measuring liquid is equal to the temperature of the oscillator tube. For this purpose, the temperature of the liquid is measured with the aid of a temperature sensor 12, as shown in FIG. 2. In this connection, it is important that the temperature of the measuring liquid is equal to the temperature of the container of the oscillator. To this end, the temperature sensor must be attached at a point of the container where it does not interfere with the resonance oscillation, since otherwise the measuring accuracy would be reduced. For that reason, the temperature sensor can be attached only at a point of the oscillator which remains at rest during the entire oscillation (see sensor 12 at said point in FIG. 2). In most applications, however, the temperature dependence of the density is not precisely known, and the oscillator filled with the liquid must be brought to a certain reference temperature with the aid of a temperature control unit.

In return, however, the embodiment of FIG. 3 is disadvantageous. Since the connecting piece 11 has a relatively large thermal mass in comparison to the thin-walled tubes 9, 10 of the oscillator 8, the temperature of the measuring liquid takes considerably longer for adjusting to a predetermined temperature, resulting in a longer time period for measuring the density.

BRIEF SUMMARY OF AN EXAMPLE EMBODIMENT

It is the object of the present invention to provide an oscillator for measuring the density of liquids which does not require a large counter mass, which can be thermostatted, which is made of metal for reasons of robustness and by means of which an accurate measured value can be determined more quickly than it was previously possible for metal oscillators. In addition, it should be possible to perform a repeat measurement without requiring the double amount of time for the entire measurement.

This object is achieved in that the initially mentioned oscillator comprises a web located between the counter mass and the connecting tube, which web spaces the resonator tubes from each other in such a way that the lengths of the resonator tubes enclosed between the counter mass and the web can be set into a diametrically opposite oscillation on the basis of which the density of the liquid located in the oscillator can be determined.

This oscillator has a lower thermal mass than the oscillator of FIG. 3, since it does not have to comprise a solid connecting piece. The web according to the invention does not have to be as solid as the connecting piece of FIG. 3, since it is not part of the container in which the liquid to be measured is received. At the same time, however, the web has sufficient rigidity so that the enclosed lengths of the resonator tubes can be set into a diametrically opposite oscillation, with high accuracy of the resonance frequency.

The invention is based on the realization that, for reducing the thermal mass of the oscillator, two separate elements can be provided instead of a single connecting piece, namely, on the one hand, the connecting tube and, on the other hand, the web. However, for achieving the reinforcement of the connecting tube, the web can be constructed so as to be less solid on the whole than the connecting piece of the oscillator of FIG. 3 so that the thermal mass is reduced despite the use of an additional element.

The resonator tubes and the connecting tube are preferably manufactured in one piece as a curved U-shaped tube, which allows a particularly simple design of the oscillator, since additional junction points between the resonator tubes and the connecting tube can be omitted. Alternatively, a separate connecting tube could also be welded or soldered to the resonator tubes.

In a preferred embodiment, a temperature sensor, preferably a thermistor, is attached to the connecting tube. Attaching the temperature sensor to the connecting tube involves the advantage that, on the one hand, the temperature can be measured directly on the container receiving the liquid and, on the other hand, the measurement of the temperature can take place on a part of the oscillator that is decoupled from the resonance oscillation. Thermistors, also known as NTC resistors (Negative Temperature Coefficient) or NTC thermistors in the prior art, are particularly suitable for this type of temperature measurement. For example, infrared measurement or a PTC resistor (Positive Temperature Coefficient) represents an alternative for measuring the temperature.

A system could be delivered, e.g., without incorporated measuring unit and evaluation device, for example, if the system is designed to be portable and measurement and evaluation are performed externally. Preferably, however, said system already comprises a measuring device which is designed for determining the frequency of the oscillation of said lengths, and an evaluation unit which is designed for determining the density of the liquid from said frequency.

Moreover, in a further preferred embodiment, the evaluation device is designed for recording a temperature measured by the temperature sensor when the density is being determined, and preferably for calculating the density for a predefined temperature. This involves the advantage that the measured density can be assigned to an actual or, respectively, desired temperature. In the simplest case, the temperature dependence of the liquid to be measured is known, and the density can be calculated with known temperature coefficients for the desired temperature. In this case, a temperature control can be omitted.

However, if the temperature dependence of the liquid to be measured is not known, it is preferred if the system includes a temperature control unit which is designed for bringing the oscillator to a predetermined temperature, and the evaluation device is preferably designed for recording the temporal density gradient during a change in temperature. In this case, the density can be determined at a desired reference temperature of, e.g., essentially 15° C. or 20° C. In doing so, the preferred recording of the temperature profile serves for extrapolating the density at the desired reference temperature already from the initial gradient of the density without performing the temperature control entirely up to the reference temperature.

A problem which arises frequently with said density measurements is that gas bubbles are enclosed in the container together with the liquid, as a result of which a precise density measurement of the liquid is made impossible. To remedy this problem, in a particularly preferred embodiment, the evaluation unit is designed for recording the temporal density gradient over a first trial period, for recording the density gradient over a second trial period after the liquid has been changed and for continuing to record the density gradient after the second trial period if the density gradient of the first trial period essentially corresponds to the density gradient of the second trial period. This embodiment is rendered possible only by the fact that the temperature sensor can be applied directly to the container without impairing the oscillation, since this leads to an almost immediate temperature measurement of the liquid. This is associated with the advantage that a second complete repeat measurement does not have to be performed, but only a first, shortened reference measurement.

In the embodiments as mentioned, it is preferred if the oscillator is mounted in the system within a receptacle filled with gas, e.g., air. Since, in the above-described method, the tube filled with the measuring liquid is supposed to oscillate at its resonance frequency, the tube may be surrounded on the outside only with a gas, since otherwise the oscillation would be dampened too strongly. This involves the disadvantage that the thermostatic control of the measuring liquid to a desired measuring temperature must take place via the gas surrounding the tubes and thus occurs much more slowly than it would be possible, for example, via a liquid.

In case of oscillators made of glass which are to be thermostatted, the time for the temperature equalization is reduced by melting the oscillator into a tube made of glass and filling said tube with the gas hydrogen, which has a significantly higher thermal conductivity than air. In addition, various methods have been developed for detecting a possible poor filling of the oscillator with the measuring liquid so that a second measurement can be omitted. A second so-called repeat measurement would indeed provide more certainty as to whether the measurement is proper, but would consume too much time for the measurement.

BRIEF DESCRIPTION OF THE DRAWINGS

Advantageous and non-limiting embodiments of the invention are explained in further detail below with reference to the drawings.

FIG. 4 shows an oscillator 13 according to the invention for measuring the density of a liquid. The same elements as in FIGS. 1-3 are numbered in FIG. 4 with the same reference symbols.

DETAILED DESCRIPTION

Figure 1:
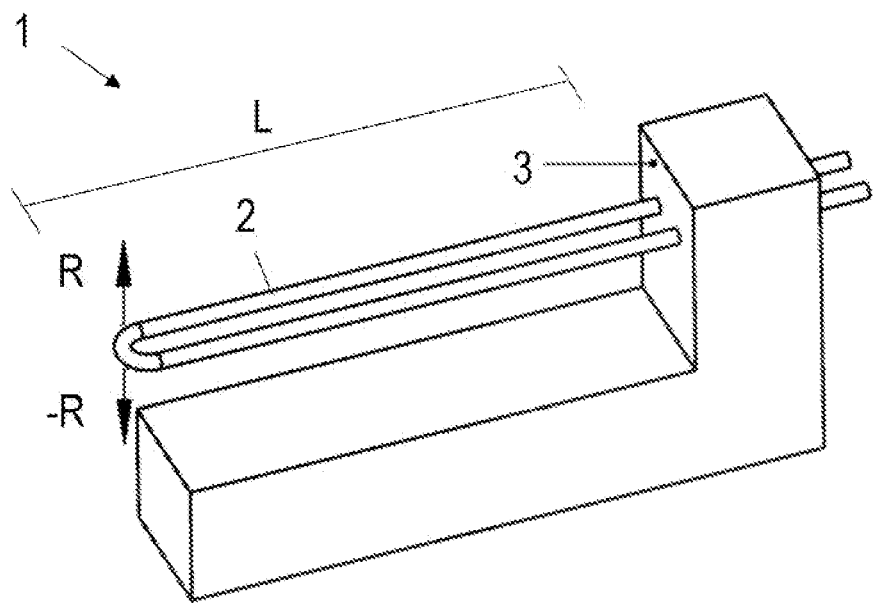
Figure 2:
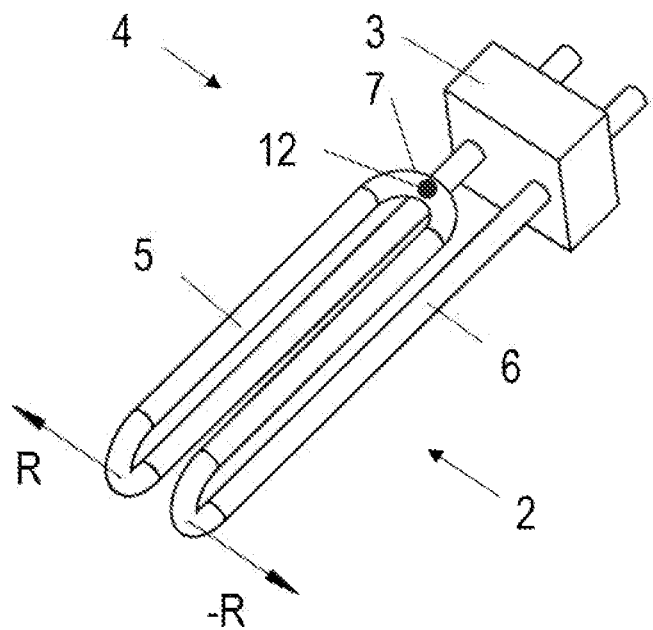
Figure 3:
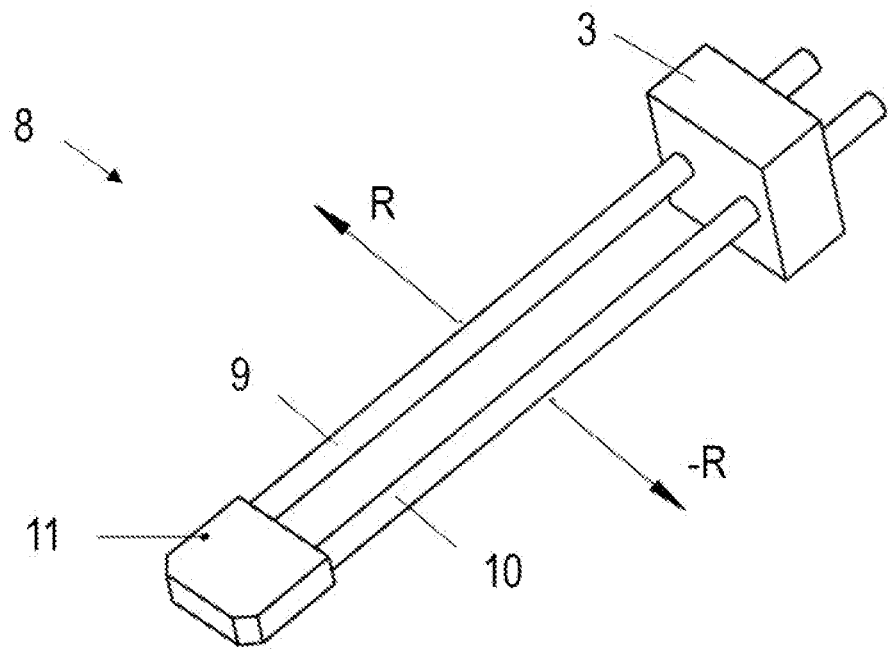

The oscillator 13 comprises a container 14 into which the liquid is filled, and a counter mass 3 into which the container 14 is clamped. The container 14 is composed of two resonator tubes 15, 16, which run essentially in parallel to each other, and a connecting tube 17, which connects the two resonator tubes 15, 16 so that liquid can flow into the inlet 18 of one of the resonator tubes 15 and can flow out via the outlet 19 of the other resonator tube 16. During a density measurement, the liquid can be located statically in the container 14 or can flow through it continuously. The oscillator 13 is manufactured from metal, i.e., both the counter mass 3 and the container 14 are made of metal.

The container 14 can be constructed in one piece or in several pieces, i.e., the resonator tubes 15, 16 and the connecting tube 17 can be manufactured in one piece as a curved U-shaped tube, or the connecting tube 17 can be welded or soldered to the resonator tubes 15, 16. The resonator tubes 15, 16 are essentially cylindrical, but may also have a different, e.g., oval or angular cross-section. The connecting tube 17 can have an identical, larger or smaller circular or different cross-section than the resonator tubes 15, 16.

The container 14 is clamped into the counter mass 3 in such a way that the resonator tubes 15, 16 protrude from the counter mass 3 such that they can be set into oscillation by an external excitation during which the resonator tubes 15, 16 oscillate against each other in the directions R, –R, whereby the centre of gravity of the oscillator 13 remains constant during the oscillation. Without any further structural measures, however, a measurement of this resonance oscillation would yield only very imprecise results, since the connecting tube 17 constitutes a soft coupling of the resonator tubes 15, 16.

For this reason, the oscillator 13 furthermore comprises a web 20 which is arranged between the counter mass 3 and the connecting tube 17 in order to reinforce the latter. In particular, the web 20 can be attached close to the junction point between the resonator tubes 15, 16 and the connecting tube 17 or directly to said point. The web 20 may also partially overlap the connecting tube 17. The connecting tube 17, however, protrudes at least partially from a side of the web 20 facing away from the counter mass 3, for example, in order to enable a temperature measurement on the connecting tube 17. If the resonator tubes 15, 16 and the connecting tube 17 are manufactured in one piece, the web 20 can, for example, be located only in an area in which the resonator tubes are cylindrical, or else it can also be arranged at least partially in a curved area of the bent U-shaped tube.

Figure 4:
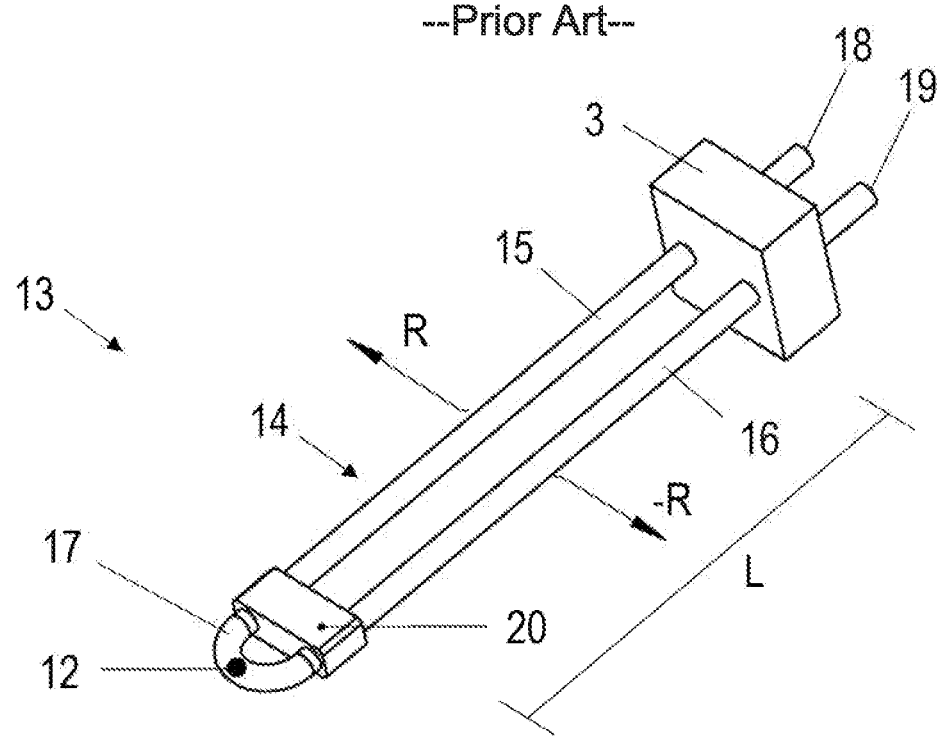
FIG. 4 shows an oscillator according to the invention for measuring the density of a liquid.

Depending on the embodiment, the web 20 may be arranged only between the resonator tubes 15, 16 and can be attached with suitable connecting means to the resonator tubes 15, 16, for example, as a plate or a rod (not shown). Alternatively, as shown in FIG. 4, the web 20 may embrace both resonator tubes 15, 16. For this purpose, the web 20 could, for example, be pushed onto the resonator tubes 15, 16 before the latter are clamped into the counter mass 3 or could be designed so as to be openable and closable accordingly.

The web 20 spaces the resonator tubes 15, 16 from each other in such a way that a length L of the resonator tubes 15, 16 is exposed between the counter mass 3 and the web 20, at which length the resonator tubes 15, 16 can be set into a resonance oscillation, if they are filled with the liquid. When the resonator tubes 15, 16 are excited, they oscillate diametrically opposite to each other, in each case one resonator tube 15, 16 in one direction R, while the other one oscillates in the opposite direction –R until they reverse their directions of movement R, –R. It is evident that the centre of gravity of the oscillator 13 remains constant due to the diametrically opposite oscillation. The density of the liquid located in the oscillator can subsequently be determined from this resonance oscillation, since the mass of the resonator tubes 15, 16 over the length L is known and the liquid in the container 14 occupies a known volume.

The web 20 can be manufactured from the same metal as the resonator tubes 15, 16 and the connecting tube 17, respectively, or else from the same metal as the counter mass 3.

The oscillator 13 can be installed in a system for density measurement (not shown). In such cases, the system comprises an excitation unit, for example, a piezoelectric element, which is designed for exciting the resonator tubes in such a way that the above-mentioned lengths will oscillate in a diametrically opposite way with a temporally constant centre of gravity, as described. Furthermore, the system may already comprise a measuring device, for example, also a piezoelectric element, which is designed for determining the frequency of the oscillation of said lengths L, and an evaluation unit which is designed for determining the density of the liquid from the above-mentioned frequency. The excitation unit and the measuring device can both be formed by a single piezoelectric element, as is known from the prior art. In particular, the system can be designed to be portable as a "hand-held device" in order to allow a flexible field of application, which is made possible by the fact that a counter mass 3 having a low weight can be used in the oscillator 13 according to the invention.

For measuring the temperature of the liquid, a temperature sensor 12 can be attached to the connecting tube 17. Since the connecting tube 17 does not oscillate together with the resonator tubes 15, 16 due to the rigidity of the web 20, the temperature measurement can be performed directly on the container 14, which enables an almost immediate measurement of the liquid's temperature, especially if the connecting tube 17 is made of metal. The temperature sensor 12 may, for example, be a thermistor (NTC resistor, Negative Temperature Coefficient). Non-contact temperature sensors 12 such as infrared sensors might be provided as well.

The temperature sensor 12 is thus used for relating the measured density of the liquid to a specific temperature. If the liquid to be measured is known per se, e.g., for determining a ratio in a mixture of two known liquids, the density for a predefined reference temperature can already be calculated via the measured density and the measured temperature, as the ratio of density to temperature will generally be known in such a case.

In order to directly measure the density at a certain reference temperature, the system comprises a temperature control unit which is designed for bringing the oscillator 13 to a predetermined temperature. For this purpose, the container 14, including the liquid contained therein, is brought to a particular temperature, i.e., is heated or cooled.

Figure 5:
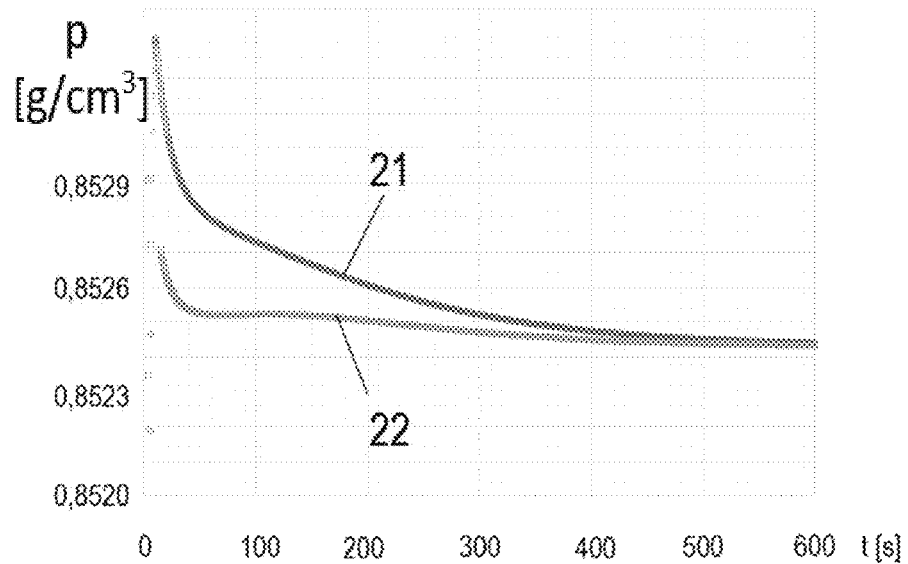
FIG. 5 shows a measured and a calculated density gradient plotted over time during a temperature control.
Figure 6:
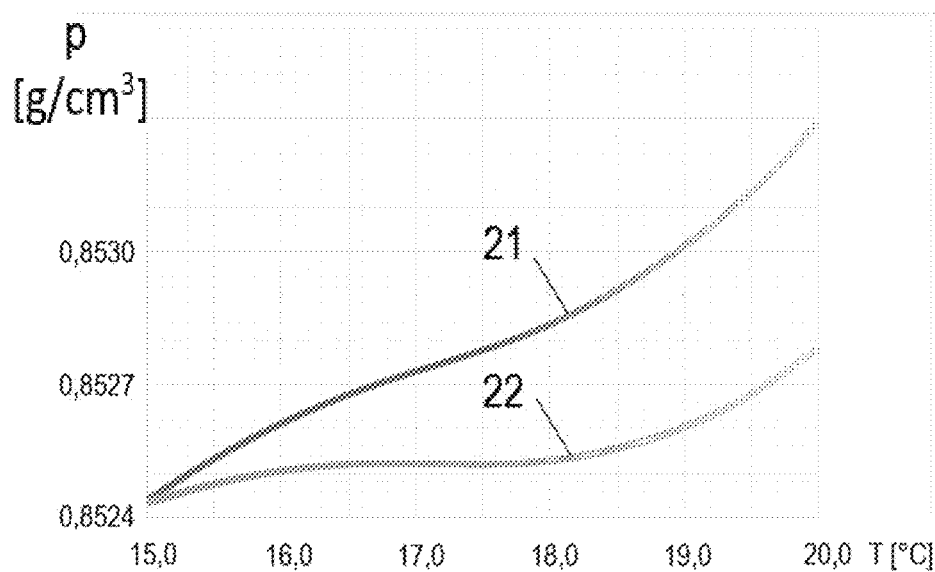
FIG. 6 shows the density gradients of FIG. 5 plotted over the temperature.

FIG. 5 shows the plotted gradient of the density in g/cm³ (ordinate) over time in seconds (abscissa) during the temperature control, in this case cooling, of a liquid from an ambient temperature of 20° C. to a reference temperature of 15° C. FIG. 6 shows the same density gradient as in FIG. 5, but with the density in g/cm³ (ordinate) being plotted over the temperature in ° C. (abscissa). In this connection, it should be noted that the temporal gradient of the density can be read from right to left in FIG. 6.

In FIG. 5, the measured density gradient is indicated by reference numeral 21, and a calculated density gradient is indicated by reference numeral 22. The differences between the measured and the calculated density gradients result, among other things, from the inertia of the system during the temperature control. It is evident that the measured density gradient approaches the calculated temperature profile with the duration of the temperature control. This can be used for extrapolating the density of the liquid at a desired reference temperature already before the reference temperature has actually been reached.

Further advantageous methods of measuring the temperature can be enabled by the direct measurement of the temperature on the non-oscillating connecting tube 17. For example, incorrect fillings of the container 14 with the liquid can be detected, since it may happen in practice that gas bubbles are enclosed in the container 14 together with the liquid.

Figure 7:
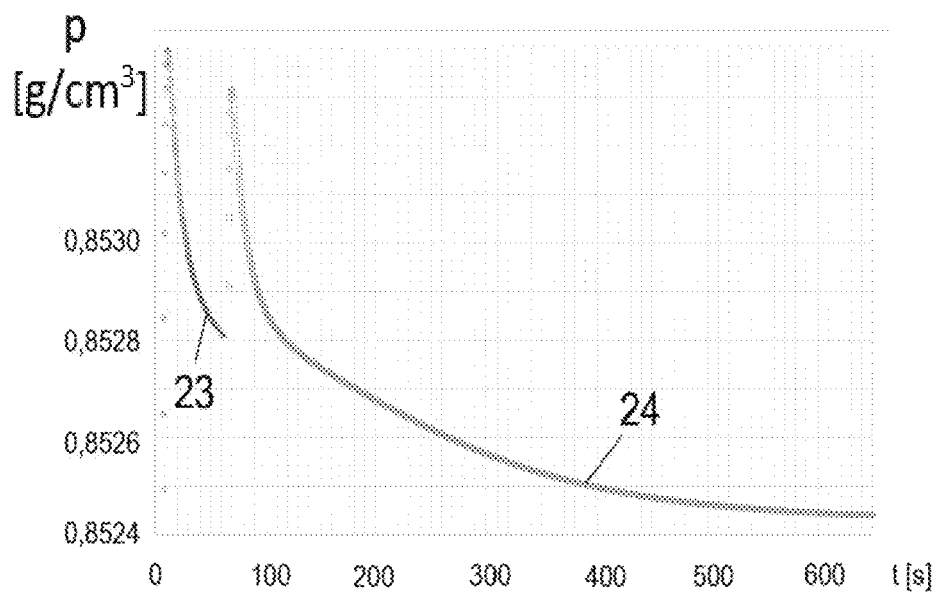
FIG. 7 shows a measured density gradient of a shortened repeat measurement plotted over time during a temperature control.
Figure 8:
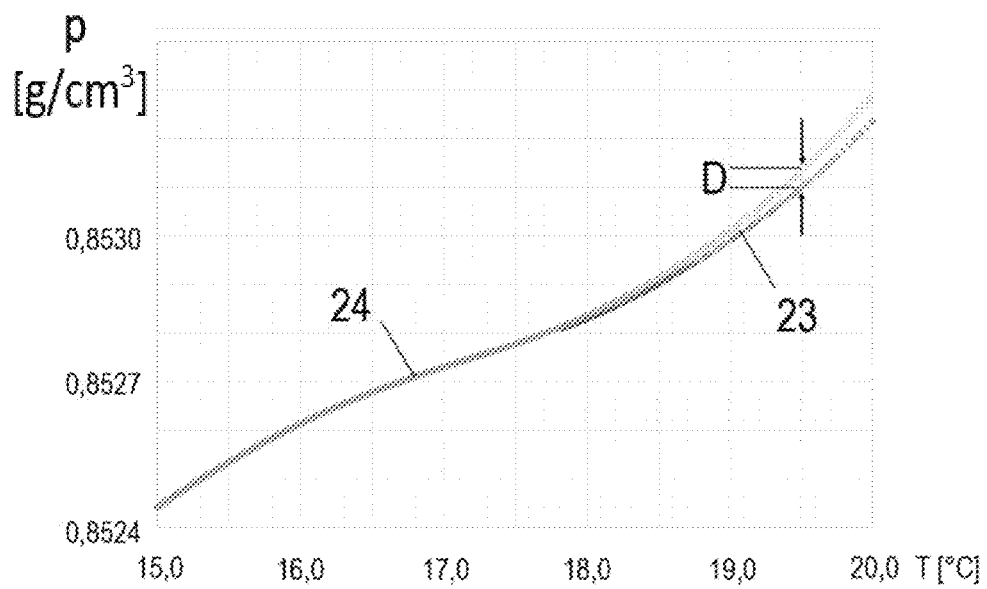
FIG. 8 shows the density gradient of FIG. 7 plotted over the temperature.

FIGS. 7 and 8 show—analogously to FIGS. 5 and 6—the gradient of the density in g/cm³ (ordinate) over time in seconds (abscissa) during the temperature control (FIG. 7) and, respectively, the gradient of the density in g/cm³ (ordinate) over the temperature in ° C. (abscissa). The density gradient of a first filling of the container with the liquid is numbered with reference symbol 23, and a second filling, which is filled into the container after the first filling, is numbered with reference symbol 24, as will be explained in detail below.

For detecting a correct filling of the container 14, the liquid is filled into the container 14 in a first step and temperature-controlled to a desired reference temperature. However, the measurement of the density is interrupted already at a point in time when the liquid has not yet reached the reference temperature, i.e., the density gradient is recorded over a first trial period during the temperature control. Thereupon, the container 14 is emptied and liquid is again filled into the container 14 or refilled without emptying.

The second filling of the container 14 with the above-mentioned liquid (which has essentially the same temperature at the beginning of measurement as the liquid during the first filling before the temperature control) is also temperature-controlled to the desired reference temperature, and, in doing so, the density gradient is recorded over a second trial period, which essentially corresponds to that of the first trial period in terms of its temporal length. If the difference D of the density gradients is below a threshold value, it may be concluded that both fillings were correct, and the density gradient of the second filling can be recorded over a further period, for example, until the density essentially no longer changes during the temperature control.

As such, the measure of the difference D of the density gradients can be chosen arbitrarily, for example, as an integral of the difference over the trial period or as a density difference at a predetermined point in time after the start of the temperature control.

It is evident that, in this preferred measurement, it is no longer necessary to perform two complete repeat measurements for verifying the measuring results, which involves a considerable saving of time. However, if the difference D is above the threshold value, the density gradient can be recorded over a third trial period, which essentially corresponds to that of the first and the second trial periods, respectively. If the third density gradient corresponds to the first or second one, the density gradient can be recorded further, since a correct filling may be assumed. This can be repeated with fourth, fifth, . . . fillings until there are at least two matching density gradients.

In case of problematic measuring liquids, several density gradients may also be recorded until there are, e.g., three matching density gradients.

As a further measure for accelerating the temperature equalization of the measuring liquid, the oscillator can be provided with a gas-tight envelope and filled with helium, which has a significantly higher thermal conductivity than air. Helium is safer to use than the gas hydrogen, which is used for oscillators made of glass, and, unlike hydrogen, does not diffuse through metal. By this measure, the time for adjusting the temperature of the measuring liquid can be reduced by more than a factor of 4.

The invention claimed is:

1. An oscillator for density measurement of a liquid, comprising a counter mass and a container for the liquid, wherein the oscillator is made of metal and the container has two identical resonator tubes, which are clamped into the counter mass essentially in parallel to each other, and a connecting tube connecting the resonator tubes, wherein the resonator tubes can be set into a resonance oscillation in which the common centre of gravity of the resonator tubes remains at rest during the resonance oscillation, and the oscillator further comprises a web located between the counter mass and the connecting tube, which web spaces the resonator tubes from each other in such a way that respective lengths (L) of the resonator tubes enclosed between the counter mass and the web can be set into a diametrically opposite oscillation on the basis of which the density of the liquid located in the oscillator can be determined.

2. The oscillator according to claim 1, wherein the resonator tubes and the connecting tube are manufactured in one piece as a curved U-shaped tube.

3. The oscillator according to claim 1, wherein a thermistor is attached to the connecting tube.

4. A system for density measurement of a liquid, the system comprising the oscillator according to claim 3, wherein the evaluation device is operable to record a temperature measured by the temperature sensor when the density is being determined, and the evaluation device is operable to calculate the density for a predefined temperature.

5. The system according to claim 4, wherein the system comprises a temperature control unit operable to bring the oscillator to a predetermined temperature, and wherein the evaluation device is operable to record the temporal density gradient during a change in temperature.

6. The system according to claim 5, wherein the evaluation unit is operable to record the temporal density gradient over a first trial period, and is operable to record the density gradient over a second trial period after the liquid has been changed and is operable to continue to record the density gradient after the second trial period if the density gradient of the first trial period essentially corresponds to the density gradient of the second trial period.

7. A system for density measurement of a liquid, the system comprising the oscillator according to claim 1 and an excitation unit operable to excite the resonator tubes in such a way that the lengths (L) will oscillate in a diametrically opposite way with a temporally constant centre of gravity.

8. The system according to claim 7, comprising a measuring device operable to determined a frequency of the oscillation of the lengths (L), and an evaluation unit operable to determined the density of the liquid from the frequency.

9. The system according to claim 7, wherein the oscillator is mounted within a receptacle filled with helium.

* * * * *